| (12) | United States Patent | (10) Patent No.: | US 9,360,688 B2 |
|---|---|---|---|
| | Patel et al. | (45) Date of Patent: | Jun. 7, 2016 |

(54) ELECTRO-OPTICAL MODULATORS WITH FOLDED GATE LAYERS

(71) Applicant: Cisco Technology, Inc., San Jose, CA (US)

(72) Inventors: Vipulkumar Patel, Breinigsville, PA (US); Prakash Gothoskar, Allentown, PA (US); Sean Anderson, Macungie, PA (US)

(73) Assignee: Cisco Technology, Inc., San Jose, CA (US)

( * ) Notice: Subject to any disclaimer, the term of this patent is extended or adjusted under 35 U.S.C. 154(b) by 21 days.

(21) Appl. No.: 14/263,389

(22) Filed: Apr. 28, 2014

(65) Prior Publication Data

US 2015/0212344 A1    Jul. 30, 2015

Related U.S. Application Data

(60) Provisional application No. 61/931,314, filed on Jan. 24, 2014.

(51) Int. Cl.
*G02F 1/025* (2006.01)
*G02F 1/01* (2006.01)
(Continued)

(52) U.S. Cl.
CPC ............. *G02F 1/011* (2013.01); *G02F 1/025* (2013.01); *G02F 1/225* (2013.01); *B82Y 20/00* (2013.01); *G02F 2001/212* (2013.01); *Y10S 977/834* (2013.01)

(58) Field of Classification Search
CPC ..... G02F 1/025; G02F 1/2257; G02F 1/0121; G02F 1/225; G02F 2001/212; G02B 6/12004; G02B 6/132; G02B 6/1347; G02B 6/136; G02B 6/26; B82Y 20/00; Y10S 977/834

USPC .................................. 385/2; 997/834; 438/31
See application file for complete search history.

(56) References Cited

U.S. PATENT DOCUMENTS

| 6,778,751 B2 | 8/2004 | Tada et al. |
| 6,845,198 B2 * | 1/2005 | Montgomery et al. ......... 385/50 |

(Continued)

FOREIGN PATENT DOCUMENTS

WO    2013146317 A1    3/2013

OTHER PUBLICATIONS

Soref, Richard et al., Low-energy MOS depletion modulators in silicon-on-insulator micro-donut resonators coupled to bus waveguides, Optics Express, Sep. 12, 2011, vol. 19, No. 19, pp. 18122-18134, The Optical Society, Washington, DC, United States.

(Continued)

*Primary Examiner* — Peter Radkowski
(74) *Attorney, Agent, or Firm* — Patterson + Sheridan LLP (57) ABSTRACT

An optical modulator may include a lower waveguide, an upper waveguide, and a dielectric layer disposed therebetween. In one embodiment, the lower waveguide may include a u-shaped region within an optical mode of the light passing through the optical modulator. By conforming the dielectric layer to the surfaces of the u-shaped region, the amount of area of the dielectric layer within a charge modulation region is increased relative to forming the dielectric layer on a single plane. Folding the dielectric layer in this manner may improve modulation efficiency. In one embodiment, the u-shaped region is formed by using ridge structures that extend from an upper surface of the lower waveguide towards the upper waveguide. To aid in lateral confinement of the optical mode, the dielectric layer may be deposited on one side surface of the ridge structures while a different dielectric material is deposited on the opposite side surface.

14 Claims, 8 Drawing Sheets

(51) Int. Cl.
*G02F 1/225* (2006.01)
*B82Y 20/00* (2011.01)
*G02F 1/21* (2006.01)

(56) References Cited

U.S. PATENT DOCUMENTS

| | | | |
|---|---|---|---|
| 7,760,980 | B2 | 7/2010 | West et al. |
| 7,991,249 | B2 | 8/2011 | Li |
| 8,363,986 | B2 | 1/2013 | Webster et al. |
| 9,002,144 | B2* | 4/2015 | Fujikata et al. ............ 385/3 |
| 2004/0208454 | A1* | 10/2004 | Montgomery et al. ...... 385/50 |
| 2006/0133754 | A1 | 6/2006 | Patel et al. |
| 2008/0112032 | A1 | 5/2008 | Vlasov et al. |
| 2009/0207472 | A1 | 8/2009 | Kim et al. |
| 2011/0176762 | A1 | 7/2011 | Fujikata et al. |
| 2011/0211786 | A1 | 9/2011 | Ushida et al. |
| 2012/0045162 | A1 | 2/2012 | Li |
| 2012/0257850 | A1* | 10/2012 | Fujikata et al. ............ 385/3 |

OTHER PUBLICATIONS

European Patent Office, International Search Report and Written Opinion, International Application No. PCT/US2015/012792, dated May 4, 2015.

Hergenrother, J.M. et al., 50 nm Vertical Replacement-Gate (VRG) nMOSFETs with ALD HfO2 Gate Dielectrics, International Electron Devices Meeting, Dec. 2001, Technical Digest, Washington, DC, United States.

Hafnium Oxide HFO2 for Optical Coating, Materion, 2014, Materion Corporation, Tucson, United States, <http://materion.com/ResourceCenter/ProductData/InorganicChemicals/Oxides/BrochuresAndDataSheets/HafniumOxideHfO2.aspx>.

Liao, Ling et al, High speed silicon Mach-Zehnder modulator, OpticsInfoBase: OSA's Digital Library, Apr. 18, 2005, vol. 13, No. 8, Washington, DC, United States.

Liu, Ansheng et al., A high-speed silicon optical modulator based on a metal-oxide-semiconductor capacitor, nature.com, vol. 427, pp. 615-619, Feb. 12, 2004, Nature Publishing Group, London, United Kingdom.

Fujikata, Junichi et al., 25 GHz Operation of Silicon Optical Modulator with Projection MOS Structure, 2010 Conference on Optical Fiber Communication, Mar. 2010, IEEE, Piscataway, United States.

Mathew, L. et al., CMOS Vertical Multiple Independent Gate Field Effect Transistor (MIGFET), IEEE International SOI Conference, 2004, IEEE, Piscataway, United States.

Multigate device, Wikipedia, Apr. 9, 2014, <http://en.wikipedia.org/wiki/Multigate_device>.

* cited by examiner

ELECTRO-OPTICAL MODULATORS WITH FOLDED GATE LAYERS

CROSS-REFERENCE TO RELATED APPLICATIONS

This application is a non-provisional application of U.S. provisional application Ser. No. 61/931,314, filed Jan. 24, 2014. The aforementioned related patent application is herein incorporated by reference in its entirety.

TECHNICAL FIELD

Embodiments presented in this disclosure generally relate to optical modulation and, more specifically, to silicon-based electro-optical modulators.

BACKGROUND

Many electro-optic devices exploit the free carrier dispersion effect to change both the real and imaginary parts of the refractive index. This exploitation is used since the unstrained pure crystalline silicon does not exhibit a linear electro-optic (Pockels) effect, and the refractive index changes due to the Franz-Keldysh effect and Kerr effect are very weak. Phase modulation in a specific region of optical devices, such as Mach-Zehnder modulators, total-internal-reflection (TIR)-based structures, cross switches, Y-switches, ring resonators and Fabry-Perot resonators, may be used to modulate the output intensity.

Free carrier concentration in electro-optic devices can be varied by injection, accumulation, depletion or inversion of carriers. Most of such devices investigated to date present some common features: they require long interaction lengths (for example, 5-10 mm) and injection current densities higher than 1 kA/cm$^3$ in order to obtain a significant modulation depth. Long interaction lengths are undesirable in order to achieve high levels of integration and miniaturization for fabricating low-cost compact device arrangements. High current densities may induce unwanted thermo-optic effects as a result of heating the structure and will, indeed, cause an opposite effect on the real refractive index change relative to that associated with free carrier movement, thus reducing its effectiveness.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is an optical device that includes a first silicon waveguide comprising at least three ridge structures extending from an upper surface of the first silicon waveguide where the ridge structures define at least two U-shaped regions on the upper surface. The optical device includes a dielectric layer disposed conformally on the upper surface in the two U-shaped regions and a second silicon waveguide disposed conformally on a first surface of the dielectric layer opposite a second surface of the dielectric layer contacting the upper surface where respective portions of the second silicon waveguide are disposed within the U-shaped regions. Moreover, the first silicon waveguide is doped a first conductivity type and the second silicon waveguide is doped a second, different conductivity type.

Another embodiment described herein includes a method for forming an optical device. The method includes forming a first silicon waveguide on a substrate where the first silicon waveguide includes at least three ridge structures that extend from an upper surface of the first silicon waveguide and define at least two U-shaped regions on the upper surface. The method includes forming a conformal dielectric layer on the upper surface in the two U-shaped regions and forming a second silicon waveguide on a first surface of the dielectric layer opposite a second surface of the dielectric layer contacting the upper surface where respective portions of the second silicon waveguide are disposed within the U-shaped regions. Moreover, the first silicon waveguide is doped a first conductivity type and the second silicon waveguide is doped a second, different conductivity type.

Another embodiment described herein is an optical device that includes a first waveguide comprising two ridge structures extending from an upper surface of the first waveguide where the two ridge structures define at least one U-shaped region on the upper surface, wherein a distance between the two ridge structures is less than 100 nanometers. The optical device includes a dielectric layer disposed conformally on the upper surface in the U-shaped region and a second waveguide disposed conformally on a first surface of the dielectric layer opposite a second surface of the dielectric layer contacting the upper surface such that a portion of the second waveguide is disposed within the U-shaped region. Moreover, the first waveguide is doped a first conductivity type and the second waveguide is doped a second, different conductivity type.

Example Embodiments

An optical modulator may include a lower waveguide, an upper waveguide, and a dielectric layer disposed therebetween. When a voltage potential is created between the lower and upper waveguides, these layers form a silicon-insulator-silicon capacitor (also referred to as SISCAP) guide that provides efficient, high-speed optical modulation of an optical signal passing through the modulator. In one embodiment, the lower waveguide may include a u-shaped region or channel near or within the optical mode of the light passing through the optical modulator. By conforming the dielectric layer to the surfaces of the u-shaped region, the amount of area of the dielectric layer within a charge modulation region is increased relative to forming the dielectric layer on a single plane. Folding the dielectric layer may increase the charge modulation region within the optical mode and improve modulation efficiency.

In another embodiment, the u-shaped region is formed by using ridge structures that extend from an upper surface of the lower waveguide towards the upper waveguide. To aid in lateral confinement of the optical mode, a portion of the dielectric layer may be deposited on one side surface of the ridge structures while a different dielectric material is deposited on the opposite side surface. Moreover, in another embodiment, the ridge structures are used to form multiple u-shaped regions on the lower waveguide. By continuing to fold the dielectric layer into these u-shaped regions, the charge modulation region in the optical mode may be increased thereby improving the efficiency of the optical modulator.

Figure 1:
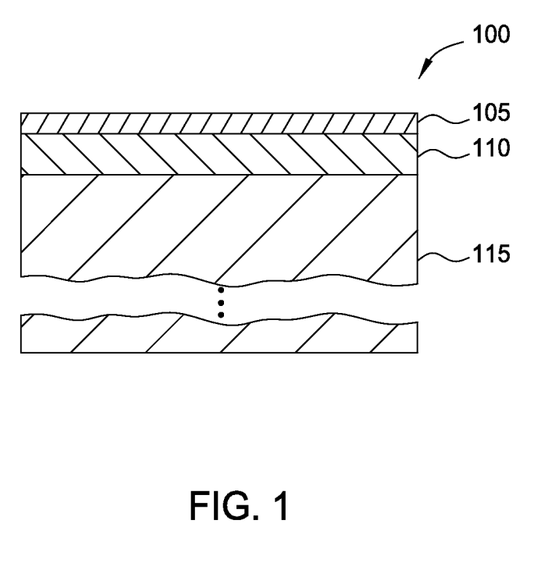
FIG. 1 illustrates a SOI device, according to one embodiment disclosed herein.

FIG. 1 illustrates a Silicon-On-Insulator (SOI) device 100, according to one embodiment disclosed herein. SOI device 100 includes a surface layer 105, a buried insulation layer 110 (also referred to as buried oxide (BOX) layer), and a semiconductor substrate 115. Although the embodiments herein refer to the surface layer 105 and substrate 115 as silicon, the disclosure is not limited to such. For example, other semiconductors or optically transmissive materials may be used to form the structure 100 shown here. Moreover, the surface layer 105 and the substrate 115 may be made of the same material, but in other embodiments, these layers 105, 115 may be made from different materials.

The thickness of the surface layer 105 may range from less than 100 nanometers to greater than a micron. More specifically, the surface layer 105 may be between 100-300 nanometers thick. The thickness of the insulation layer 110 may vary depending on the desired application. The thickness of the insulation layer 110 may directly depend on the size of the mode being coupled to the SOI device 100 and the desired efficiency. As such, the thickness of insulation layer 110 may range from less than one micron to tens of microns. The thickness of the substrate 115 may vary widely depending on the specific application of the SOI device 100. For example, the substrate 115 may be the thickness of a typical semiconductor wafer (e.g., 100-700 microns) or may be thinned and mounted on another substrate.

For optical applications, the silicon surface layer 105 and insulation layer 110 (e.g., silicon dioxide, silicon nitride, and the like) may provide contrasting refractive indexes that vertically confine an optical signal in a waveguide in the surface layer 105. In a later processing step, the surface layer 105 of the SOI device 100 may be etched to form one or more silicon waveguides. Because silicon has a high refractive index compared to an insulator such as silicon dioxide, the optical signal remains primarily in the waveguide as it propagates across the surface layer 105.

Folding the Gate Dielectric Layer to Increase the Charge Modulation Region

Figure 2A:
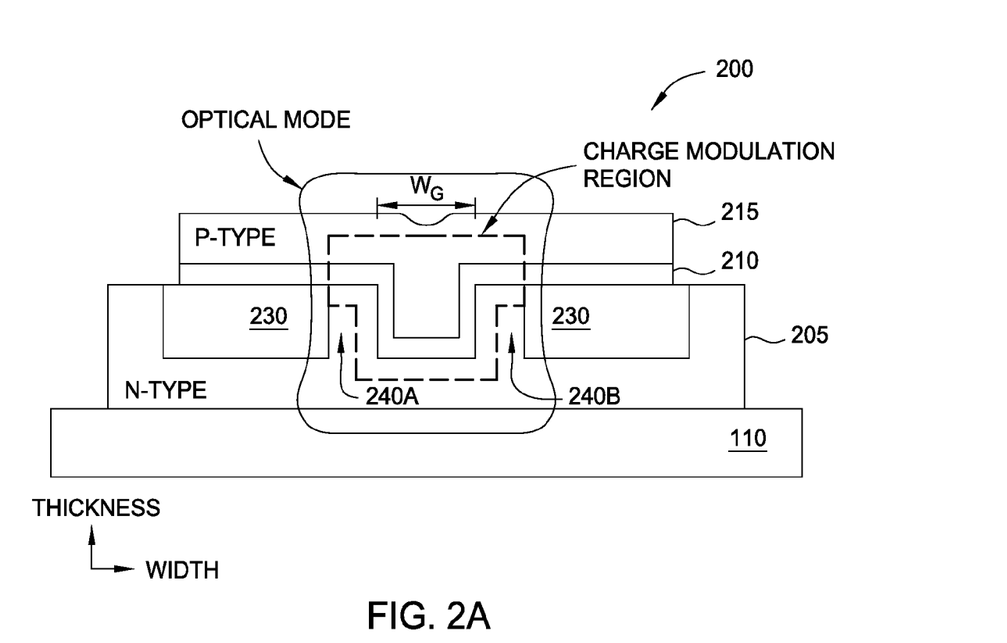
FIGS. 2A-2C illustrate cross-sectional views of modulators with u-shaped lower waveguides, according to embodiments disclosed herein.
Figure 2B:
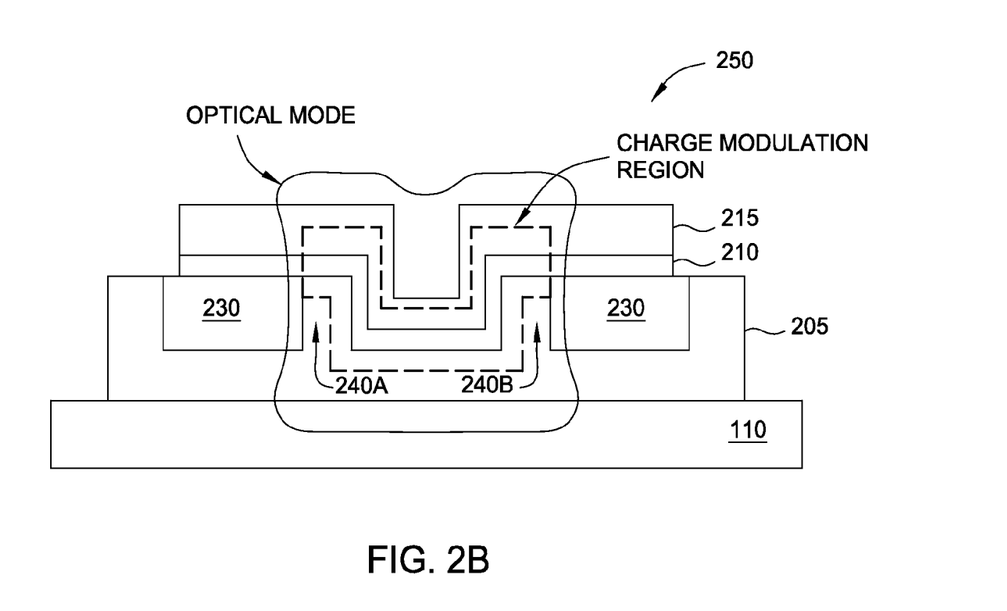
Figure 2C:
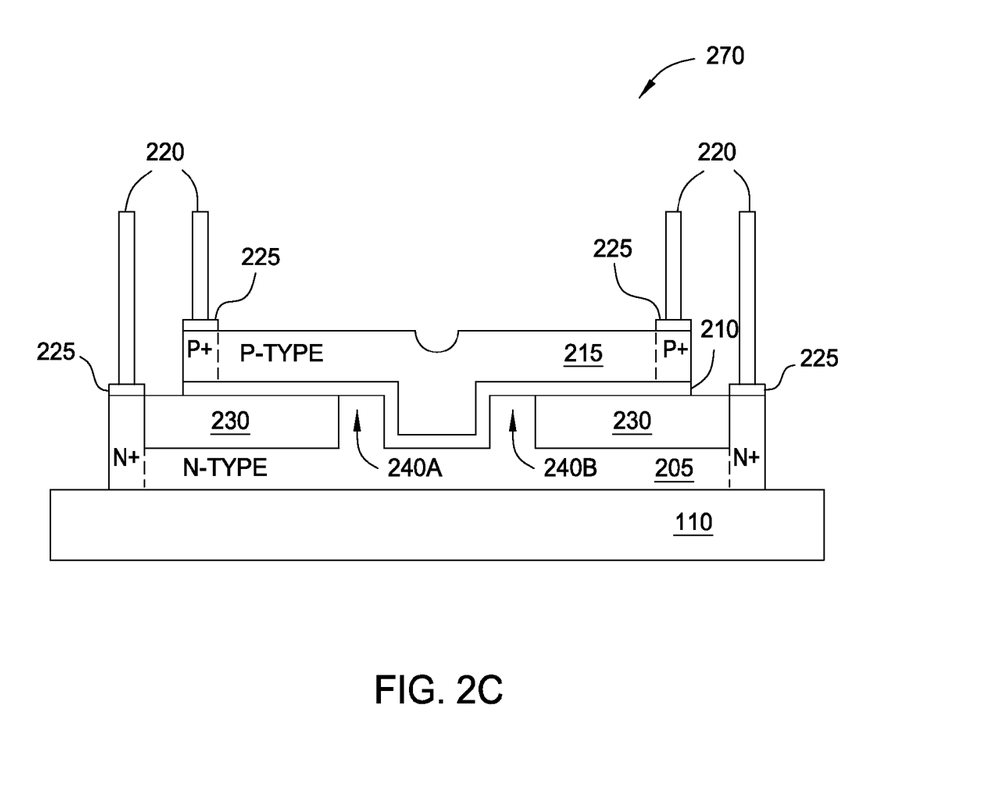

FIGS. 2A-2C illustrate cross-sectional views of modulators with u-shaped lower waveguides, according to embodiments disclosed herein. Specifically, FIG. 2A illustrates a lower waveguide 205 with two centered ridge portions 240A and 240B that define a U-shaped region encapsulated by the ridge portions 240. The two ridge portions 240A-B establish a gap ($W_G$) in which at least a portion of the gate dielectric layer 210 and upper waveguide 215 is disposed. In one embodiment, the width of the gap is 75 nanometers or less (e.g., from 20 to 75 nanometers). However, in another embodiment, the width of the gap may be greater than 75 nanometers (e.g., up to 450 nanometers). Furthermore, the width of the gap may depend on the polarization of the optical signal used. For example, the optimal gate width may vary widely depending on whether the optical signal is TM or TE. The thickness of the lower and upper waveguides 205, 215 may range between 50-200 nanometers. Moreover, the thickness of the ridges 240 (i.e., the distance the ridges extend away from the lower waveguide 205) may range between 50-200 nanometers. The thickness of the dielectric layer 210 may range from 20 nanometers to 1 or 2 nanometers.

The width of the ridges 240 may be dependent on the width of the gap as well as the desired width of the optical mode. That is, as the widths of the ridge portions 240 increase, this may also increase the width of the optical mode. As such, the width of the ridges 240 may be set to establish the desired lateral confinement of the optical mode.

As shown, the gate dielectric layer 210 (also referred to as referred to as either "gate dielectric" or gate oxide") establishes a charge modulation region or charge accumulation region shown by the dashed box where free carriers (e.g., electrons and holes) flow into and out of the p-doped and n-doped waveguides 205 and 215. Doing so creates an active region where the switching function associated with the modulator 200 (e.g., switching speeds above 1 Gb/s) can be controlled by a voltage potential across the gate dielectric layer 210. In one embodiment, the voltage potential is used to alter the phase of the optical signal propagating through the modulator as in, for example, a Mach-Zehnder interferometers (MZI). However, the modulators described herein may also be used in other types of devices such as ring resonators, Fabry-Perot cavities, etc.

The gate dielectric layer 210 may be referred to as either "gate dielectric" or "gate oxide" where it is to be understood that an oxide is only an exemplary form of a dielectric that may be used in the modulator device. The gate dielectric layer 210 may comprise any material that allows for fast charging/discharging of the free carriers (e.g., enables switching speeds greater than or equal to 1 Gb/s). A non-limiting list of suitable materials includes hafnium oxide, oxynitride, bismuth oxide, silicon nitride, silicon oxide, and combinations of these materials. Furthermore, using high-K dielectric materials as the gate dielectric provide higher capacitance and greater charge densities over using dielectrics with lower dielectric constants (assuming same thickness and voltage potential). For example, hafnium oxide and silicon nitride (high-K dielectrics) have higher dielectric constants than silicon dioxide, and thus, enable greater charge densities across the gate dielectric layer relative to using silicon dioxide. Using the higher voltages may increase the modulation efficiency—i.e., the amount the optical signal is phase shifted relative to the applied voltage.

Although the Figures described herein illustrate placing a gate dielectric layer 210 between the opposite doped waveguides, this is not a requirement. For all the embodiments described herein, the modulators may still perform optical modulation if the gate dielectric layer 210 is omitted and the two waveguides directly contact to form a PN junction. In this example, the PN junction establishes the charge modulation region where the free carriers flow into and out of the waveguides. However, including the gate dielectric layer 210 may improve the efficiency of the optical modulation.

Folding the gate dielectric layer 210 into the gap between the ridge portions 240 may increase the overlap of the charge modulation region and the optical mode. Stated differently, the area of the charge modulation region within the optical mode is increased relative to a modulator where the gate dielectric layer 210 forms a single plane. In addition, one of ordinary skill in the art will recognize that the dimensions of the waveguides 205 and 215, and more specifically, the dimensions of the ridges 240, may be adjusted to ensure the portions of the optical mode with the greatest intensity of the optical signal fall within the charge modulation region. Additionally, the dimensions of the modulator 200 may vary depending on the mode of the optical signal—e.g., transverse electric (TE) mode or transverse magnetic (TM) mode. Thus, a modulator 200 with the u-shaped gap as shown optimized for a TE modal signal may have different dimensions than a modulator 200 optimized for TM modal signal. Moreover, although the ridge portions 240 are shown centered on the lower waveguide 205, this is not a requirement.

FIG. 2B illustrates a gap width where the upper waveguide 215 does not completely fill the gap between the ridge portions 240. Here, the width of the gap may exceed 75 nanometers (e.g., between 75 and 450 nanometers). The choice between modulator 200 and 250 may be dependent on the limitations of the fabrication equipment used to manufacture the modulators. If, for example, the equipment is unable to form ridges with less than 75 nanometer spacing, modulator 250 may be preferred. The optical mode in modulator 250 may be wider than the optical mode in modulator 200, and thus, have a more spread out optical intensity. Nonetheless, folding the gate dielectric layer 210 into the gap between the ridge portions 240 may increase the area of the charge modulation region in the optical mode relative to a modulator with a single plane gate layer.

As shown in FIG. 2C, the lower waveguide 205 is doped N-type while the upper waveguide 215 is doped P-type. However, for all the embodiments where the dopant type is specified, the dopant types may be reversed—e.g., the lower waveguide 205 may be doped P-type while the upper waveguide 215 is N-type. Furthermore, the waveguides 205 and 215, which serve as electrodes for the capacitive structure of the modulator 280, may be silicon based. For example, the material of the waveguides 205, 215 may include strained silicon, $Si_xGe_{1-x}$, substantially single crystal silicon (i.e., crystalline silicon), polycrystalline silicon, and combinations thereof. In one embodiment, because of process constraints that will be discussed later, the lower waveguide 205 may include crystalline silicon while the upper waveguide 215 may be polycrystalline silicon. However, in other embodiments, both waveguides 205 and 215 may be made from crystalline silicon or polycrystalline silicon.

A width of the waveguides 205 and 215 may be selected to keep electrical contacts 225, which may be metallic or formed from silicide, and vias 220 out of the optical mode. Because electrically conductive materials generally have higher optical absorption coefficients, the waveguides 205 may be designed such that any conductive contacts are sufficiently outside the boundaries of the optical mode. Moreover, as shown in FIG. 2A, the portions of the waveguides 205, 215 proximate to the contacts 225 are more heavily doped than the portions of the waveguide 205, 215 where optical modulation occurs. Doing so may improve the electrical connection between the silicon-based waveguides 205, 215 and the contacts 225 thereby lowering the electrical resistance and RC constant associated with the modulator 200. Heavily doping the portion of the waveguides proximate to the electrical connection to an external voltage source may be applied to any of the embodiments described herein. Furthermore, the concentration of the dopant may increase in the waveguides 205, 215 as the distance from the optical mode increases. Because the dopant may have a deleterious effect on the optical signal, the dopant concentration in the waveguides 205 and 215 where the optical mode is located may be lightly doped. The dopant concentration may be increased in a stepwise or continuous manner as the distance from the optical mode increases. Doing so improves the electrical conductivity of the waveguides 205 and 215 and mitigates the negative affect the dopant has on the optical signal. Furthermore, in one embodiment, the electrical contacts 225 are omitted and the vias 220 contact the heavily doped portions of the waveguides 205, 215 directly. Moreover, the contacts may be equally spaced from the ridge portions 240A and 240B. That is, the rightmost electrical contact 225 may be the same distance from ridge 240B as is the leftmost contact 225 from ridge 240A. This spacing may also apply in later embodiments that include multiple U-shaped regions defined by ridge portions in the lower waveguide 205. Centering the ridges 240 between the electrical contacts 225 may reduce the overall electrical resistance and improve the RC time constant of the modulator 270.

Although not shown, in one embodiment, the modulators shown in FIGS. 2A-2C are surrounded by a dielectric material. For example, the dielectric material may be disposed along the side edges of the lower waveguide 205 and the three exposed edges of the upper waveguide 215. This dielectric material may insulate the modulators from other electrical components on the optical chip.

Figure 3A:
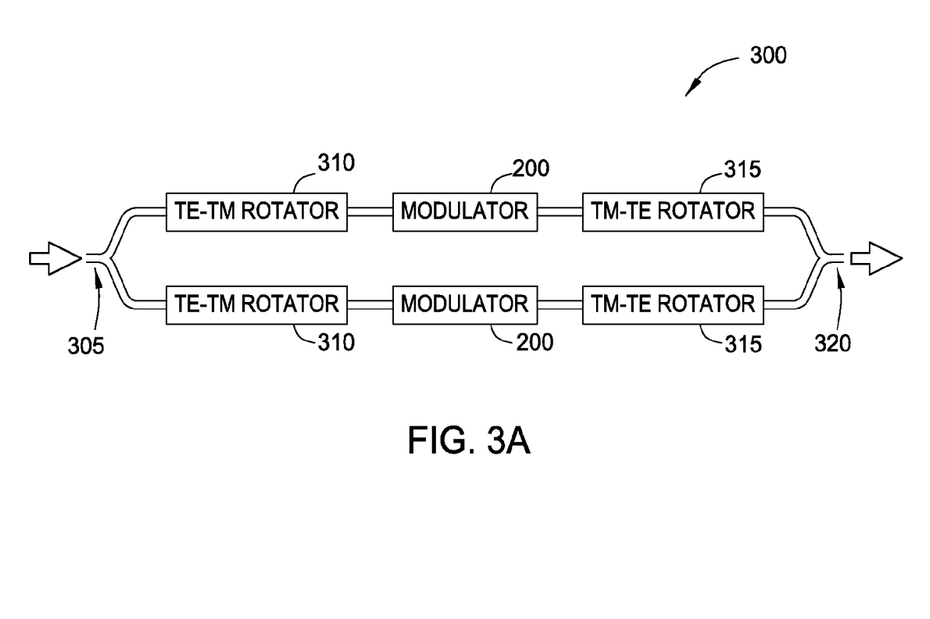
FIGS. 3A-3B illustrate Mach-Zehnder interferometers with polarization converters, according to embodiments described herein.
Figure 3B:
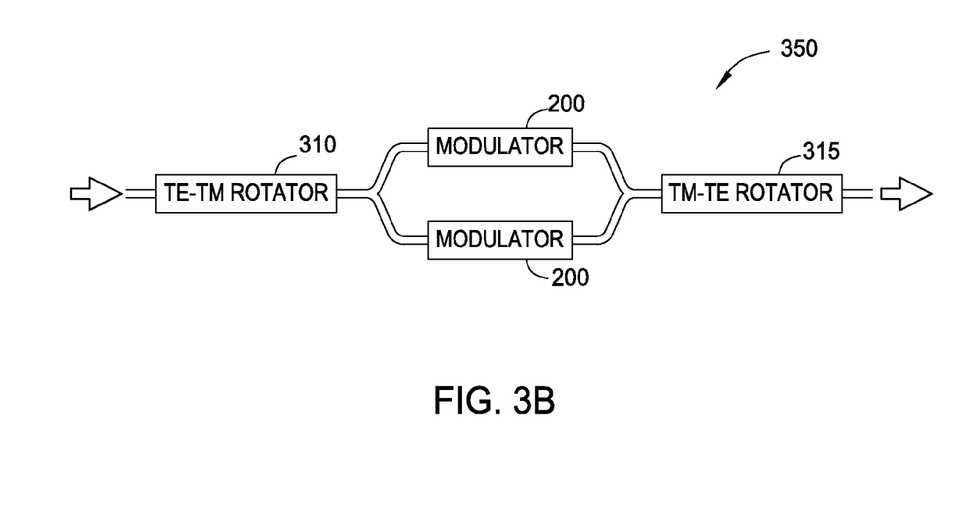

FIGS. 3A-3B illustrate Mach-Zehnder interferometers (MZI) with polarization converters, according to embodiments described herein. Specifically, FIG. 3A illustrates an MZI 300 that includes an input 305 that receives an optical signal (e.g., a continuous wave) and an output 310 that transmits an optical signal that is modulated based on the electrical signals used to drive the modulators 200. In this example, the optical signal has a TE mode which may be preferred in some optical systems (i.e., a chip). However, it may be desired to use a modulator 200 in the MZI that is optimized for a TM modal signal rather than a TE modal signal. As such, after the y-splitter, the MZI 200 includes respective TE-TM rotators 310 in each of the branches that convert the optical signal from having a TE mode to a TM mode. This converted optical signal then passes through the modulators 200 and is reconverted to an optical signal with a TE mode by the TM-TE rotators 320. The reconverted optical signals are then recombined at the y-splitter to form a modulated optical signal that has a TE mode. FIG. 3B illustrates an MZI 350 that performs the same function as MZI 300 but the TE-TM rotator 310 is located to the left of the leftmost y-splitter while the TM-TE rotator 320 is located to the right of the rightmost y-splitter.

In one embodiment, the TE-TM rotators 310 and the TM-TE rotators 320 may be specially designed portions of the waveguides in the MZIs 300 and 350 (e.g., silicon waveguides) which, by virtue of their structure, convert the optical signal from TE mode to TM mode and vice versa. Alternatively, these rotators 310, 320 may be separate components that are inserted or fabricated between portions of the waveguides in the MZIs 300 and 350 to perform the respective conversions.

Although MZI 300 and MZI 350 are shown including modulator 200, the same MZI system may be used with any of the modulators discussed herein—e.g., the modulators shown in FIGS. 2B-2C, 4D, 5, 6, 7A-7B, and 8A-8B. Moreover, Further still, for optical systems that primarily use an optical signal having a TM mode, it may be preferred to use a modulator optimized for TE mode optical signal in an MZI. In which case, the reverse of what is shown in FIGS. 3A and 3B is true—i.e., the MZI would include at least one TM-TE rotator 320 upstream from the modulator 200 and at least one TE-TM rotator 310 downstream from the modulator 200.

Figure 4A:
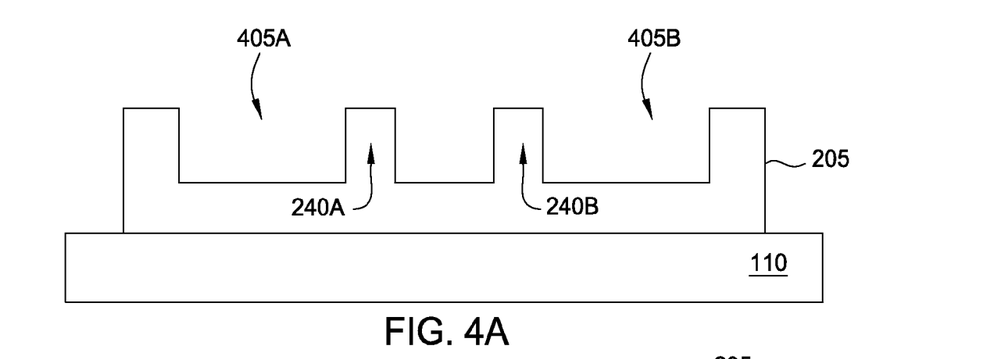
FIGS. 4A-4D illustrate a flow for fabricating the u-shaped lower waveguide, according to embodiments disclosed herein.

FIGS. 4A-4D illustrate a flow for fabricating the u-shaped lower waveguide, according to embodiments disclosed herein. In FIG. 4A, the lower waveguide 205 that includes ridge portions 240 is disposed onto the insulation layer 110. If the height of the gap is the same as the thickness of the ridge portions 240, then the ridge portions 240 and the gap may be formed in the same etching step. However, in other examples, it may be desired to have a gap with a height that is different than the thickness of the ridge portions 240. Stated differently, the height of the gap may be a parameter that can be optimized separate from the thickness of the ridge portions 240. Here, instead of forming separate ridges 240, one single ridge is formed by etching the trenches 405A and 405B. That is, the gap between the ridges 240A and 240B is not etched. The trenches 405A and 405B may then be filled with dielectric and the top surface may be planarized using, for example, a chemical-mechanical planarization. Then, resist may be patterned onto the top surface such that there remains an opening where the gap is desired. In a subsequent etch, only the portion of the waveguide 205 between the ridges 240 is removed. This etch can be controlled to result in the desired height of the gap and provides depth control independent of the wing region for optimizing the mode shape and mode overlap with the charge modulation region.

Figure 4B:
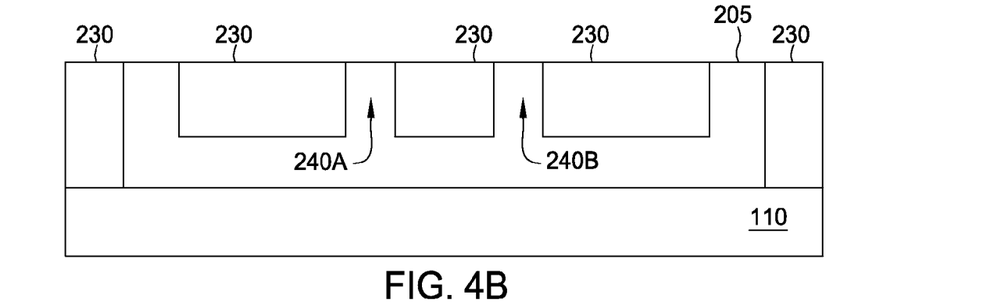
Figure 4C:
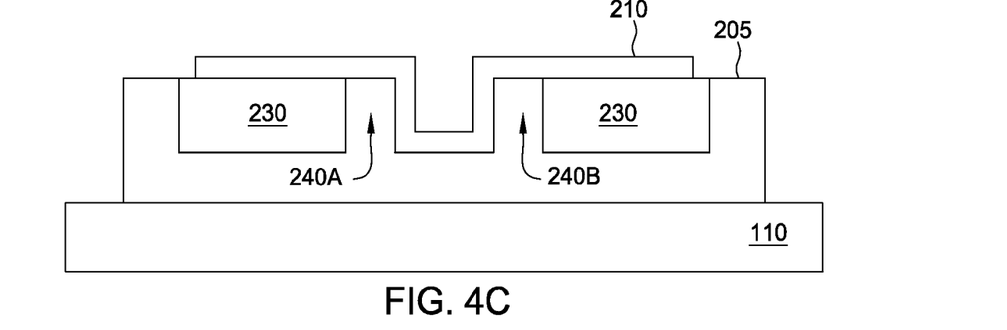
Figure 4D:
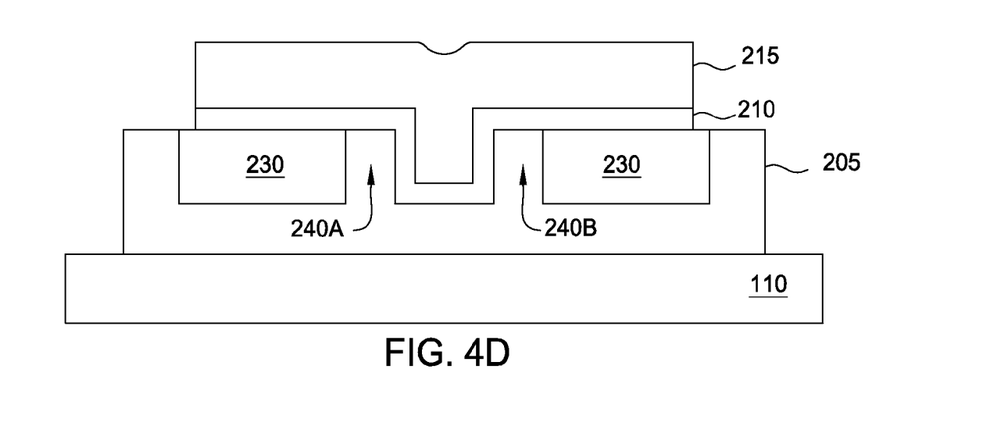

In FIG. 4B, dielectric material is deposited and then planarized such that at least top surfaces of the ridge portions 240 are exposed. Although not shown, the portion of the dielectric material 230 in the gap between the ridge portions 240 is then selectively removed. In FIG. 4C, the gate dielectric layer 210 is disposed onto the planarized surface and within the gap. In one embodiment, the gate layer 210 is deposited conformally onto the U-shaped portion of the gap in the lower waveguide 205. In FIG. 4D, the upper waveguide 215 is formed such that at least of portion of the waveguide is formed between the ridge portions 240 within the gap. In this manner, a folded gate dielectric layer 210 may be formed on a lower waveguide 205 with a double-ridge structure.

Moreover, in the embodiment shown, the upper waveguide 215 is patterned such that its width is less than the width of the lower waveguide 205 to permit electrical connections to an upper surface in the modulator which will be discussed later in FIG. 8A. Alternatively, as shown in FIG. 8B, the widths of the lower and upper waveguides 205, 215 may be formed to provide an interleaved design.

Figure 5:
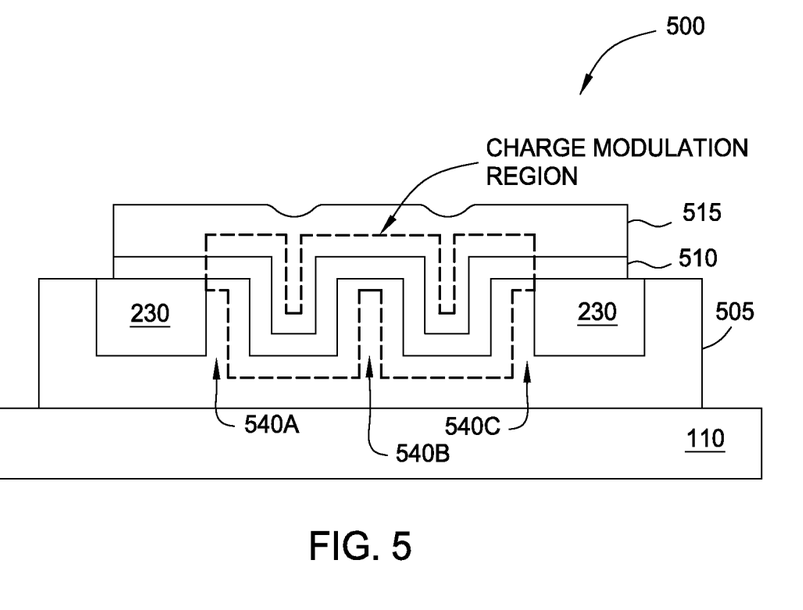
FIG. 5 illustrates a cross-sectional view of a modulator with a multiple u-shaped indentations, according to one embodiment disclosed herein.

FIG. 5 illustrate a cross-sectional view of a modulator 500 with a multiple u-shaped indentations or regions, according to one embodiment disclosed herein. Specifically, modulator 500 includes a lower waveguide 505 that includes three ridge portions 540A, 540B, and 540C arranged to form multiple gaps therebetween. As discussed above, the width of each gap may range from 20 nanometers to 200 nanometers. Moreover, the respective widths of the gaps may be the same or different. Furthermore, the height of the gaps may be the same as, or different from, the thickness of the ridge portions 540. As such, a similar technique as shown in FIGS. 4A-4D may be used to fabricate modulator 500 except that three (or more) ridge portions 540 are formed rather than the two ridge portions 240.

As shown, increasing the number of ridges, and thus, the number of gaps, increases the number of folds of the gate dielectric layer 510. Moreover, increasing the gaps may increase the amount of area the charge modulation region occupies in the optical mode (depending on the size of the optical mode, the height of the gaps, etc.). For example, if the width of the optical mode is set to a certain dimension (e.g., 100 nanometers), then using multiple gaps may increase the area of the charge modulation region within the optical mode relative to using one only gap as shown in FIGS. 2A and 2B. For instance, assuming the heights of the gaps are the same, the gate dielectric layer 210 in modulator 200 has only two vertical portions that extend down towards the insulation layer while the gate dielectric layer 510 in modulator 500 has four. Thus, so long as the fabrication equipment has the necessary capabilities, it may be preferred to add as many ridges and gaps as possible within the desired lateral boundaries of the optical mode in order to increase the area of the charge modulation region in the optical mode.

Figure 6:
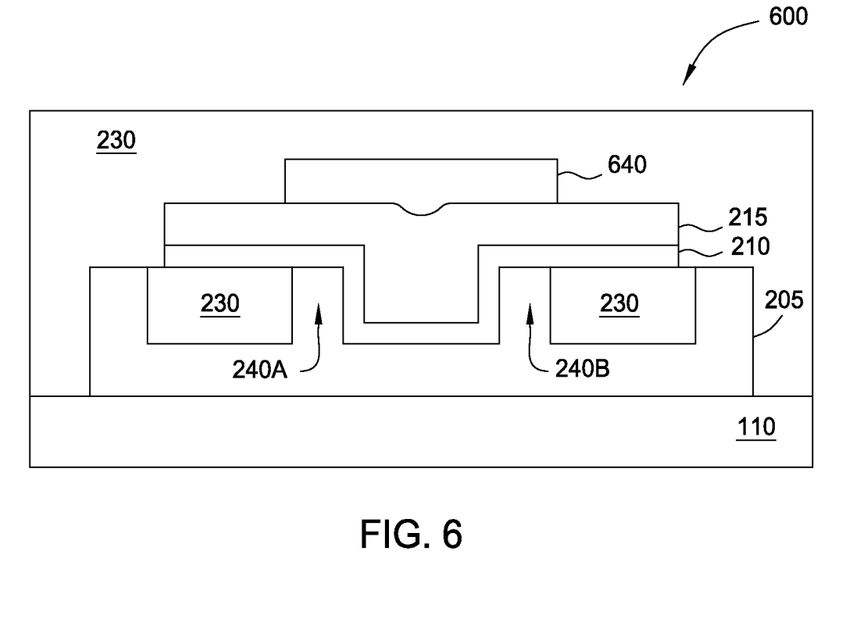
FIG. 6 illustrates a cross-sectional view of a modulator with a ridge on the upper waveguide, according to one embodiment disclosed herein.

FIG. 6 illustrates a cross-sectional view of a modulator 600 with a ridge 640 on the upper waveguide 215, according to one embodiment disclosed herein. Specifically, modulator 600 has a similar structure as modulator 200 in FIG. 2A except for the ridge 640 which may be formed from silicon nitride or any other dielectric material that is different from dielectric material 230. Moreover, the refractive index of the material used for ridge 640 may be greater than the refractive index of the dielectric material 230. In another embodiment, the ridge 640 is the same material as the material of the upper waveguide 215 and may be deposited at the same time or a different time as when the material of the waveguide 215 is deposited onto the modulator 600.

As shown here, the width of ridge 640 extends approximately to the leftmost and rightmost edges of the ridge portions 240. Ridge 640 provides a design parameter for adjusting the vertical confinement of the optical mode. In one example, the thickness of the ridge 640 may be selected such that the greatest optical intensity within the optical mode is within the boundary of the charge modulation regions shown in FIGS. 2A and 2B. For instance, increasing the thickness of ridge 640 may shift the center of the optical mode up towards the ridge 640 which may increase the optical intensity of the signal in the charge modulation region.

The ridge 640 may also be used in the modulator shown in FIG. 5 which includes multiple gaps formed within the lower waveguide 505. In this case, the width of the ridge 640 may extend from the leftmost edge of ridge 540A to the rightmost edge of ridge 540C. Again, the thickness of the ridge 640 may be selected in order to ensure the portion of the optical mode with the greatest optical intensity is in the charge modulation region.

Figure 7A:
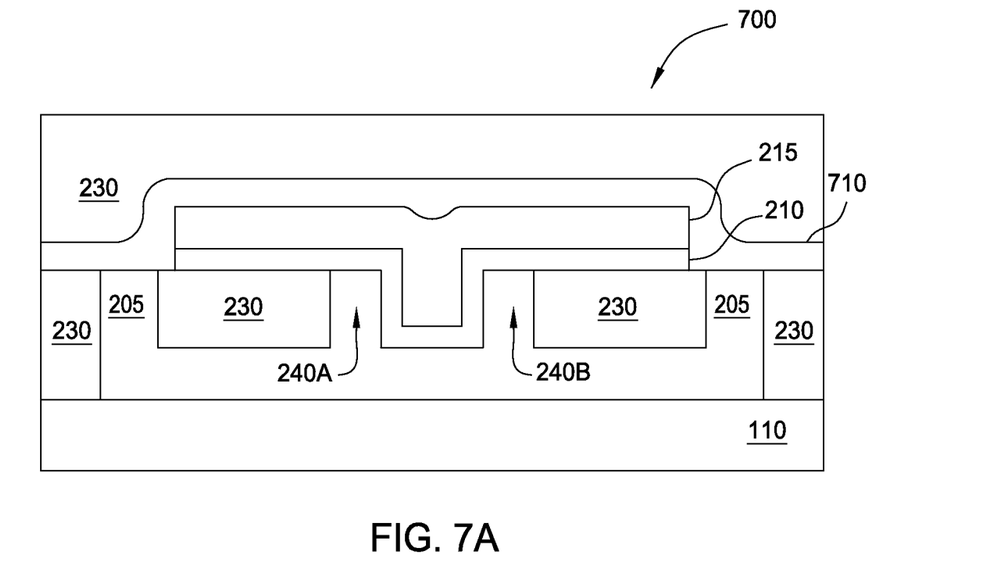
FIG. 7A-7B illustrate capping modulators with u-shaped lower waveguides with a nitride layer, according to embodiments disclosed herein.
Figure 7B:
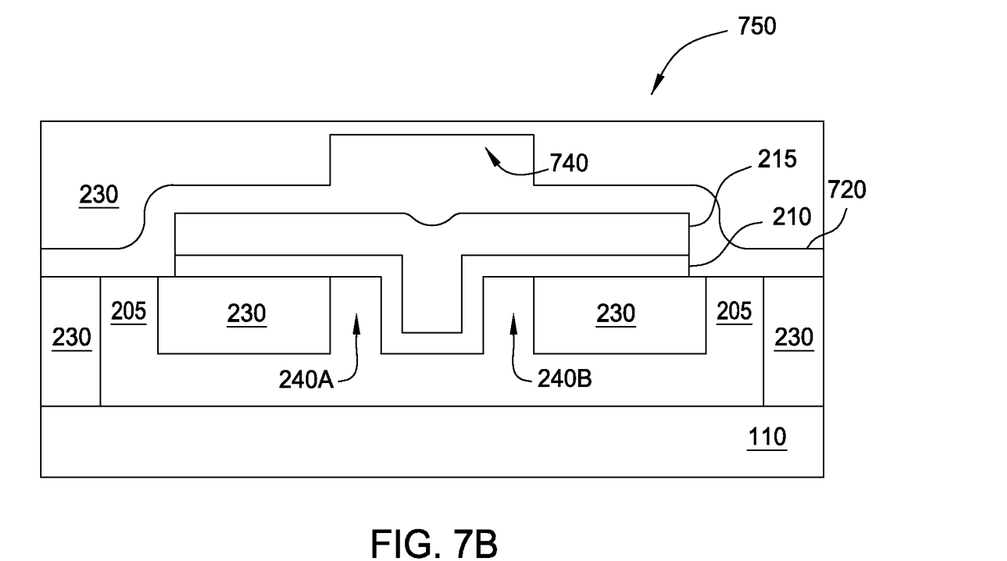

FIG. 7A-7B illustrate capping modulators with a silicon nitride layer, according to embodiments disclosed herein. As shown in FIG. 7A, the modulator 700 has a similar structure as the modulator 200 in FIG. 2A. However, modulator 700 includes a silicon nitride capping layer 710 that covers portions of the lower and upper waveguides 205, 215. As such, FIG. 7A illustrates that the modulator 700 with a u-shaped lower waveguide 205 is compatible with processes that require a nitride capping layer 710. Moreover, although dielectric material 230 is shown disposed along two sides of the lower waveguide 205, in another embodiment, the capping layer 710 may extend along these edges.

FIG. 7B illustrates a modulator 750 that includes silicon nitride capping layer 720 with a ridge 740 aligned with the ridge portions 240 in the lower waveguide 205. As shown, the width of the ridge 740 extends approximately from the leftmost edge of ridge 240A to the rightmost edge of 240B. The thickness of the ridge 740 may be used as control parameter to shift the optical mode so that the greatest intensity of the optical signal is within the charge modulation region. After forming the nitride layer 720, an additional layer of the dielectric material 230 may be formed over the modulator 750. In this embodiment, the dielectric material 230 may be any dielectric material different from silicon nitride that provides confinement of the optical mode. In another embodiment, the dielectric material 230 above the capping layer 720 may be different from the dielectric material 230 beneath the capping layer 720. For example, the dielectric material below the capping layer 720 may be high density oxide while the dielectric material above the capping layer 720 is low pressure chemical vapor deposition (LPCVD) oxide, or vice versa.

The nitride capping layer 710 and 720 shown in FIGS. 7A and 7B may also be used in the modulator 500 shown in FIG. 5 where the lower waveguide 505 includes at least three ridge portions 540 that establish multiple gaps. In this case, the width of the nitride ridge 740 may extend approximately from the leftmost edge of 540A to the rightmost edge of ridge 540C.

Figure 8A:
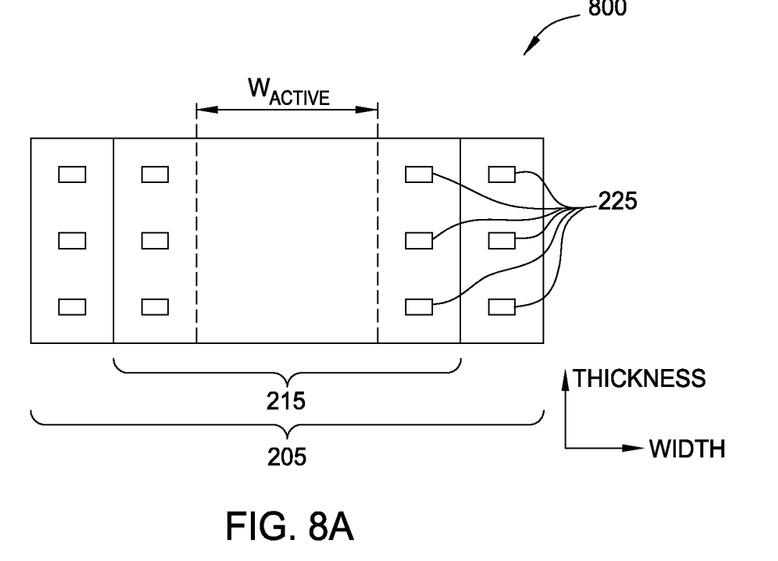
FIGS. 8A-8B illustrate top views of modulators, according to embodiments disclosed herein.
Figure 8B:
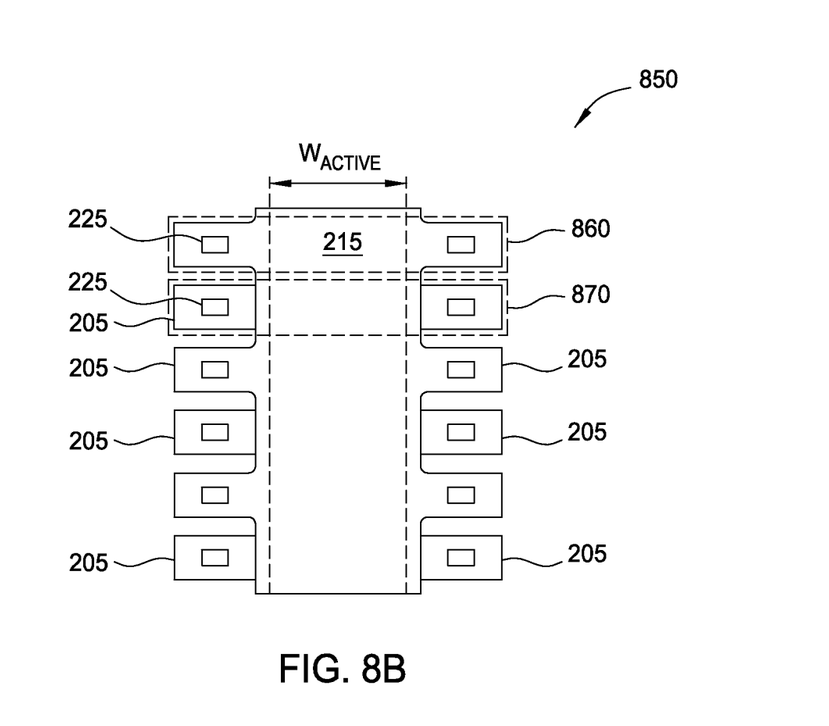

FIGS. 8A-8B illustrate top views of the modulator shown in FIG. 2C, according to embodiments disclosed herein. In the modulator 800 shown in FIG. 8A, only the top surface of the upper waveguide 215 and the portion of the top surface of the lower waveguide 205 not occluded by the upper waveguide 215 are shown. For clarity, any vias or dielectric material is omitted from these views. The top surfaces include a plurality of electrical contacts 225. In one embodiment, all the electrical contacts 225 on the upper waveguide 215 and all the contacts 225 on the lower waveguide 205 are driven using the same voltages, e.g., $V_P$ and $V_N$, respectively. Varying the voltages causes a voltage difference in the active region which changes the free carriers in the charge modulation region and changes the phase of the optical signal traveling along the length of the modulator 800. In FIG. 8A, the width of the lower waveguide 205 is greater than the width of the upper waveguide 215 in order to provide room for vias (not shown) to extend from, for example, an upper surface of the modulator to the electrical contacts 225.

In the modulator 850 shown in FIG. 8B, the metal contacts 225 on the waveguides are interleaved which may reduce the overall width of the modulator. Here, the first row 860 of the modulator 850 is used to connect metal contacts 225 on the upper waveguide 215 to a voltage source that drives the voltage $V_P$. Conversely, the second row 870 of modulator 350 is used to connect metal contacts 225 on the lower waveguide 205 to a voltage source that drives the voltage $V_N$. In this manner, each row of the modulator may switch between contacts 225 used to connect to the lower and upper waveguides 205, 215. The length of the modulators 800 and 850 may range from 50 microns to 1000 microns. In one embodiment, for modulators 800 and 850 driven by voltages around +/−1V, the length may be between 250-450 microns.

Modulator 800 of FIG. 8A provides lower series resistance than modulator 850 in FIG. 8B but there exists a parasitic capacitance between the lower waveguide 205 and upper waveguide 215 in the regions where the lower waveguide 205 extends beyond the width of the upper waveguide 215. However, the design of the modulator 850 in FIG. 8B reduces the parasitic capacitance in this region. Furthermore, one of the two modulators 800, 850 may be preferred depending on spatial limitations. For example, if space in an optical system is limited in the width direction, then modulator 850 may be preferred over modulator 800. If the length of the modulator is a critical design feature, then the reverse may be true.

Although modulators 800 and 850 are discussed specifically in relationship to FIG. 2C, these top views may also be the top views of other modulators described herein. For example, the modulators described in FIGS. 2A-2B, 4D, 5, 6, and 7A-7B may be designed with top views as shown in FIGS. 8A and 8B.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The flowchart and block diagrams in the Figures illustrate the architecture, functionality and operation of possible implementations of systems and methods according to various embodiments. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

In view of the foregoing, the scope of the present disclosure is determined by the claims that follow.

What is claimed is:

1. An optical device comprising:
 a first silicon waveguide comprising at least three ridge structures extending from an upper surface of the first silicon waveguide, the ridge structures defining at least two U-shaped regions on the upper surface;
 a dielectric layer disposed conformally on the upper surface in the two U-shaped regions; and
 a second silicon waveguide disposed conformally on a first surface of the dielectric layer opposite a second surface of the dielectric layer contacting the upper surface, wherein respective portions of the second silicon waveguide are disposed within the U-shaped regions,
 wherein the first silicon waveguide is doped a first conductivity type and the second silicon waveguide is doped a second, different conductivity type,
 wherein the second silicon waveguide includes a ridge portion extending away from an upper surface of the second silicon waveguide opposite a lower surface of the second silicon waveguide contacting the dielectric layer, wherein at least of one of the U-shaped regions and the ridge portion are disposed along an axis perpendicular to the upper surface of the first waveguide.

2. The optical device of claim 1, wherein a distance between the ridge structures forming each of the two U-shaped regions is less than half a micron.

3. The optical device of claim 1, wherein at least one of the ridge structures is between two outer ridge structures, wherein a dielectric material is disposed along respective sides of the two outer ridge structures facing away from the at least one ridge structure, wherein the dielectric material is different than a material of the dielectric layer.

4. The optical device of claim 1, wherein the first silicon waveguide comprises raised wings, wherein the ridges structures are arranged between the raised wings, and wherein a dielectric material different from a material of the dielectric layer is disposed between the raised wings and the ridge structures.

5. The optical device of claim 4, wherein the raised wings are more heavily doped the first conductivity type than a remaining portion of the first silicon waveguide.

6. The optical device of claim 1, wherein first and second electrical contacts are coupled to a same side of the first silicon waveguide and third and fourth electrical contacts are coupled to a same side of the second silicon waveguide, wherein the first and second electrical contacts are equally spaced from a closest respective ridge structure, wherein the optical device is configured to receive a first voltage at the first and second electrical contacts and a second voltage at the third and fourth electrical contacts to generate a voltage potential that establishes a charge modulation region.

7. The optical device of claim 1, wherein a width of the ridge portion extends between a leftmost edge of a first one of the ridge structures and a rightmost edge of a second one of the ridge structures, wherein the first and second ridge structures form the at least one U-shaped region disposed between the ridge portion and the first waveguide.

8. The optical device of claim 1, wherein the ridge portion comprises a different material than a material of the second silicon waveguide.

9. An optical device comprising:
a first waveguide comprising two ridge structures extending from an upper surface of the first waveguide, the two ridge structures defining at least one U-shaped region on the upper surface, wherein a distance between the two ridge structures is less than 100 nanometers;
a dielectric layer disposed conformally on the upper surface in the U-shaped region; and
a second waveguide disposed conformally on a first surface of the dielectric layer opposite a second surface of the dielectric layer contacting the upper surface, wherein a portion of the second waveguide is disposed within the U-shaped region,
wherein the first waveguide is doped a first conductivity type and the second waveguide is doped a second, different conductivity type,
wherein the second silicon waveguide includes a ridge portion extending away from an upper surface of the second silicon waveguide opposite a lower surface of the second silicon waveguide contacting the dielectric layer, wherein the U-shaped region and the ridge portion are disposed along an axis perpendicular to the upper surface of the first waveguide.

10. The optical device of claim 9, wherein the distance between the two ridge structures is between 25 nanometers and 75 nanometers.

11. The optical device of claim 10, wherein a thickness of the lower waveguide in a region excluding the two ridge structures is between 50 nanometers to 200 nanometers.

12. The optical device of claim 9, wherein a dielectric material is disposed along respective sides of the two ridge structures facing away the other ridge structure, wherein the dielectric material is different than a material of the dielectric layer.

13. The optical device of claim 9, wherein a material of the ridge portion is the same as a material of the second waveguide.

14. The optical device of claim 9, wherein the ridge portion is arranged to be between respective planes defined by a leftmost edge of a leftmost ridge structure of the two ridge structures and a rightmost edge of a rightmost ridge structure of the two ridges structures.

* * * * *